US009042256B2

(12) United States Patent
Reves Balleste et al.

(10) Patent No.: US 9,042,256 B2
(45) Date of Patent: May 26, 2015

(54) NETWORK ISOLATION SYSTEM

(71) Applicant: Broadcom Corporation, Irvine, CA (US)

(72) Inventors: Xavier Reves Balleste, Barcelona (ES); Jose Abad Molina, Rincón de la Victoria (ES); Ildefonso Gomariz Abril, Barcelona (ES); Gerard Reves Vilaplana, Barcelona (ES)

(73) Assignee: Broadcom Corporation, Irvine, CA (US)

(*) Notice: Subject to any disclaimer, the term of this patent is extended or adjusted under 35 U.S.C. 154(b) by 147 days.

(21) Appl. No.: 13/842,688

(22) Filed: Mar. 15, 2013

(65) Prior Publication Data
US 2014/0105043 A1 Apr. 17, 2014

Related U.S. Application Data

(60) Provisional application No. 61/714,125, filed on Oct. 15, 2012.

(51) Int. Cl.
H04J 3/14 (2006.01)
H04L 12/26 (2006.01)
H04W 52/52 (2009.01)
H04L 12/801 (2013.01)
H04B 3/54 (2006.01)

(52) U.S. Cl.
CPC ............... *H04L 43/08* (2013.01); *H04W 52/52* (2013.01); *H04L 47/10* (2013.01); *H04B 3/54* (2013.01)

(58) Field of Classification Search
USPC ........ 370/252, 329; 73/599, 861.53; 375/260, 375/295, 345; 455/234.2, 249.1, 250.1
See application file for complete search history.

(56) References Cited

U.S. PATENT DOCUMENTS

| 2010/0105421 A1* | 4/2010 | Wright et al. .................. 455/522 |
| 2011/0021154 A1* | 1/2011 | Marinier et al. ........... 455/67.11 |
| 2013/0121281 A1* | 5/2013 | Lie et al. ....................... 370/329 |
| 2014/0105043 A1* | 4/2014 | Reyes Balleste et al. ..... 370/252 |

* cited by examiner

*Primary Examiner* — Phuongchau Ba Nguyen
(74) *Attorney, Agent, or Firm* — McDermott Will & Emery LLP

(57) ABSTRACT

A network isolation system may include a network interface, a power level detector, and a processor. The network interface may be configured to receive signals over channels, where the signals include at least one local network signal, e.g. a signal originating on a local network, and at least one non-local network signal, e.g. a signal originating on a non-local network. The power level detector may be configured to determine attenuation values of the received signals. The signal processor may be configured to discard a first signal and reallocate the channel over which the first signal was received, without processing the first signal in a frequency domain, when the attenuation value of the first signal fails to satisfy a signal threshold. In one or more implementations, the signal threshold may differentiate the local network signal from the non-local network signal based at least in part on the determined attenuation values.

25 Claims, 6 Drawing Sheets

NETWORK ISOLATION SYSTEM

CROSS-REFERENCE TO RELATED APPLICATIONS

The present application claims the benefit of U.S. Provisional Patent Application Ser. No. 61/714,125, entitled "Network Isolation System," filed on Oct. 15, 2012, which is hereby incorporated by reference in its entirety for all purposes.

TECHNICAL FIELD

The present description relates generally to an isolation system, and more particularly, but not exclusively, to a network isolation system.

BACKGROUND

Power line communication (PLC) systems carry data on a conductor that is also used simultaneously for AC electric power transmission or electric power distribution. Power line communications systems operate by impressing a modulated carrier signal on the wiring system. Power line communications can be used in a home to interconnect home computers, peripherals, and/or home entertainment devices that have a network port, such as an Ethernet port. For example, powerline adapter units plug into power outlets and establish a network connection using the existing electrical wiring in the home. The powerline adapter units are then coupled to the home devices, such as through Ethernet interfaces, which allows the devices to share video and data without running dedicated network cables throughout the home. Powerline adapter units in a home may use encryption, or other security protocols, for data security.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
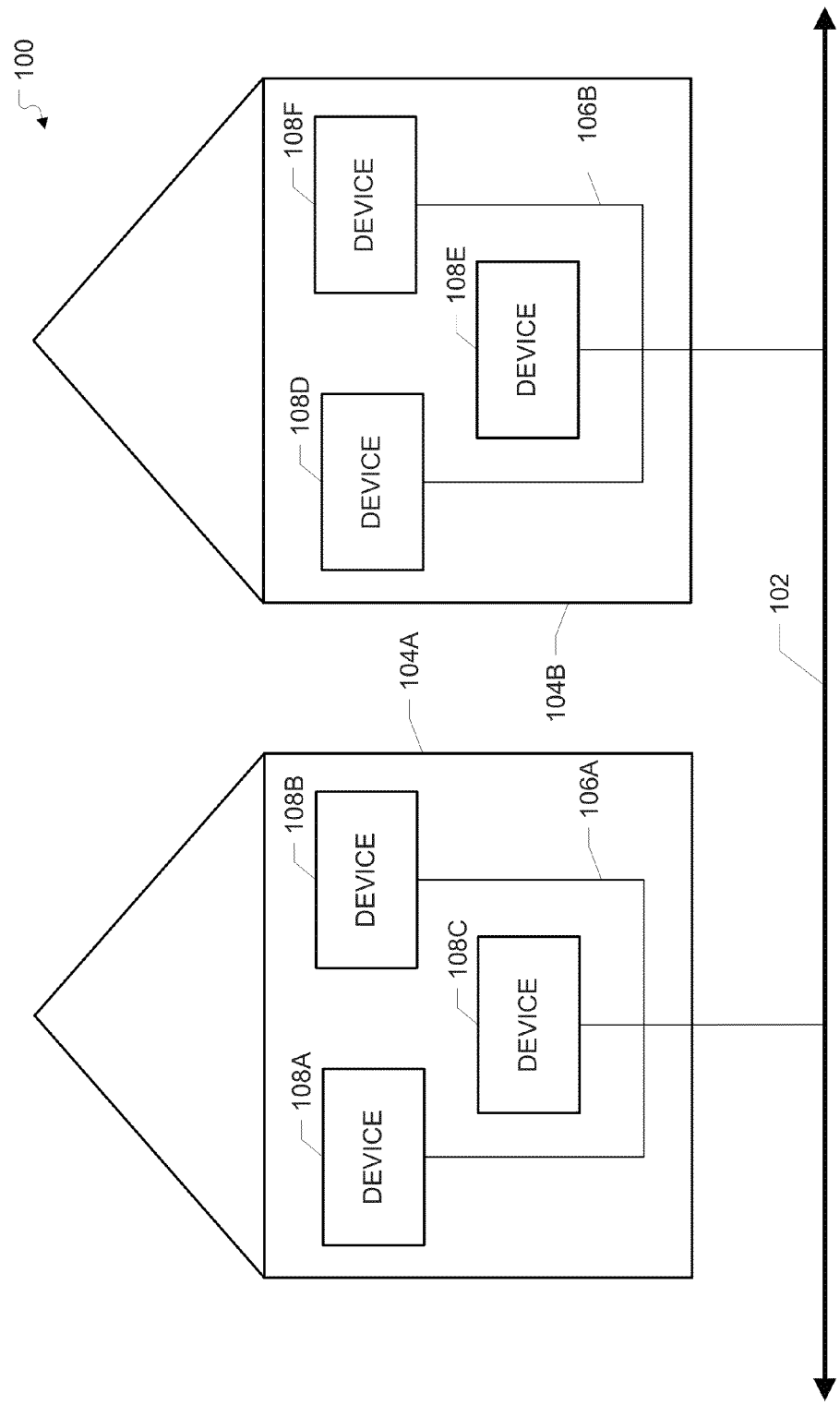
FIG. 1 illustrates an example network environment in which a network isolation system may be implemented in accordance with one or more implementations.

FIG. 1 illustrates an example network environment 100 in which a system for network isolation may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The network environment 100 includes a main line 102 and one or more units 104A-B, such as buildings, offices, apartments, dwellings, etc. The unit 104A includes a network 106A that interconnects the devices 108A-C and a main line 102. The unit 104B includes a network 106B that interconnects the devices 108D-F and the main line 102. The network 106A may be representative of any interconnected media through which signals, e.g. data signals, can be transmitted to/from the devices 108A-C, and the network 106B may be representative of any interconnected media through which signals can be transmitted to/from the devices 108D-F. For example, the networks 106A-B may include interconnected power lines, interconnected cable (coaxial) lines, interconnected telephone lines, etc., and/or may be representative of wireless signals transmitted to/from the devices 108A-F. The main line 102 may be a physical line that is of the same (or similar) form as the media of one or more of the networks 106A-B, and that is communicatively coupled to the networks 106A-B. For example, the main line 102 may include a main electric line, a main cable (coaxial) line, a main phone line, etc., and/or may be representative of a wireless signal being transmitted to the networks 106A-B, such as via satellite. Thus, signals transmitted by the devices 108A-F may propagate from network 106A to main line 102 and to network 106B, and vice-versa.

The devices 108A-F may be any device capable of transmitting and/or receiving signals over the networks 106A-B. In one or more implementations, the devices 108A-F may be powerline network adapters and/or modems, such as power line communication (PLC) adapters, digital subscriber line (DSL) adapters and/or modems, multimedia over coax alliance (MOCA) adapters and/or modems, telephone line adapters and/or modems, and/or wireless adapters and/or modems. Any of the devices 108A-F may include a memory for storing instructions and a processor that executes the instructions stored in the memory, and/or any of the devices 108A-F may be coupled to a computing device that includes such a memory and/or such a processor. Any of the devices 108A-F may also include one or more detectors, such as a power level detector, that are configurable to determine signal metrics of a received signal, such as signal strength, signal attenuation, or generally any signal metric. In one or more implementations, any of the devices 108A-F may be, may include, or may be part of, the system and/or components thereof that are described below with respect to FIG. 6.

In one or more implementations, any of the devices 108A-F may be communicatively coupled to an electronic device, such as a computing device, via a device interface, such as an Ethernet interface. Any of the devices 108A-F may receive data from the coupled electronic device and may generate a signal carrying the data that is capable of being transmitted over the media of the networks 106A-B. For example, a device 108A that is a powerline adapter may receive data from a coupled computing device and may generate a modulated carrier signal containing the data that may be transmitted over the network 106A that includes powerlines.

In operation, the devices 108A-C transmit signals to/from one another over the network 106A, and the devices 108D-F transmit signals to/from one another over the network 106B, such as modulated carrier signals containing data generated by electronic devices coupled to the devices 108A-F. Since the networks 106A-B are coupled to the main line 102, the signals transmitted by the devices 108A-C over the network 106A may pass through the main line 102 to the network 106B, and vice-versa. The devices 108A-F may use encryption to prevent any data transmitted on signals that are leaked out to the main line 102 from being accessed by a third party. However, in one or more implementations the devices 108A-F may transmit signals using the same resources, such as on the same channels, and therefore the signals transmitted by the devices 108A-C that pass through the main line 102 to the network 106B may impact the performance of the signals transmitted over the network 106B by the devices 108D-F, and vice-versa.

Furthermore, in one or more implementations, the devices 108A-F may be compliant with one or more standards, such as the Institute of Electrical and Electronics Engineers (IEEE) 1901 HomePlug standard. The one or more standards may require that the devices 108A-F allocate or reserve channels and/or other resources for any received signals, irrespective of whether the received signals can be decrypted by the devices 108A-F. For example, the devices 108D-F may allocate channels and/or other resources for signals received from the devices 108A-C via the main line 102, even though the devices 108D-F may be unable to process and/or decrypt the received signals, and vice-versa.

In the subject network isolation system, any of the devices 108A-F may determine a signal threshold based on signal metrics, such as signal strengths, attenuation values, or any other determinable signal metric, that are determined for signals received from the networks 106A-B. For example, a given device, such as the device 108A, may determine a signal threshold that may be used to differentiate signals originating on the network 106A from signals originating on the network 106B based on the attenuation values, or signal strengths, of the received signals. Since the signals received by the device 108A that originated on the network 106B will generally have a higher attenuation value, or weaker signal strength, than signals received by the device 108A that originated on the network 106A, a signal threshold may differentiate the signals that originated on the network 106A from the signals that originated on the network 106B. An example process for determining a signal threshold is discussed further below with respect to FIG. 3. Accordingly, any of the devices 108A-C may generate its own signal threshold that may be used to filter and discard signals received from the devices 108D-F, and vice versa.

Since the devices 108A-C can use the signal threshold to discard the signals received from the devices 108D-F, the devices 108A-C may reallocate the channels and/or any other resources associated with the signal received from the devices 108D-F, and vice-versa. Thus, the devices 108A-C may be able to re-use the channels and/or other resources associated with the signals received from the devices 108D-F, e.g. the devices 108A-C may be able to transmit signals over the network 106A on top of the signals transmitted by the devices 108D-F, e.g. on the same channel, and vice-versa. An example process for discarding signals received from non-local networks and reallocating associated channels and/or resources is discussed further below with respect to FIG. 2.

In one or more implementations, the units 104A-B may both be part of a building complex, such as an office complex, an apartment complex, a condominium complex, a hotel, or generally any building that may include multiple units. In these implementations, the main line 102 may be a main line within the building complex that is coupled to each of the units 104A-B. Alternatively, or in addition, the main line 102 may further be coupled to an external line that is coupled to another building complex. Thus, signals passing over the main line 102 and onto the networks 106A-B may include signals from other units in the same building complex and/or signals from other buildings and/or building complexes.

Figure 2:
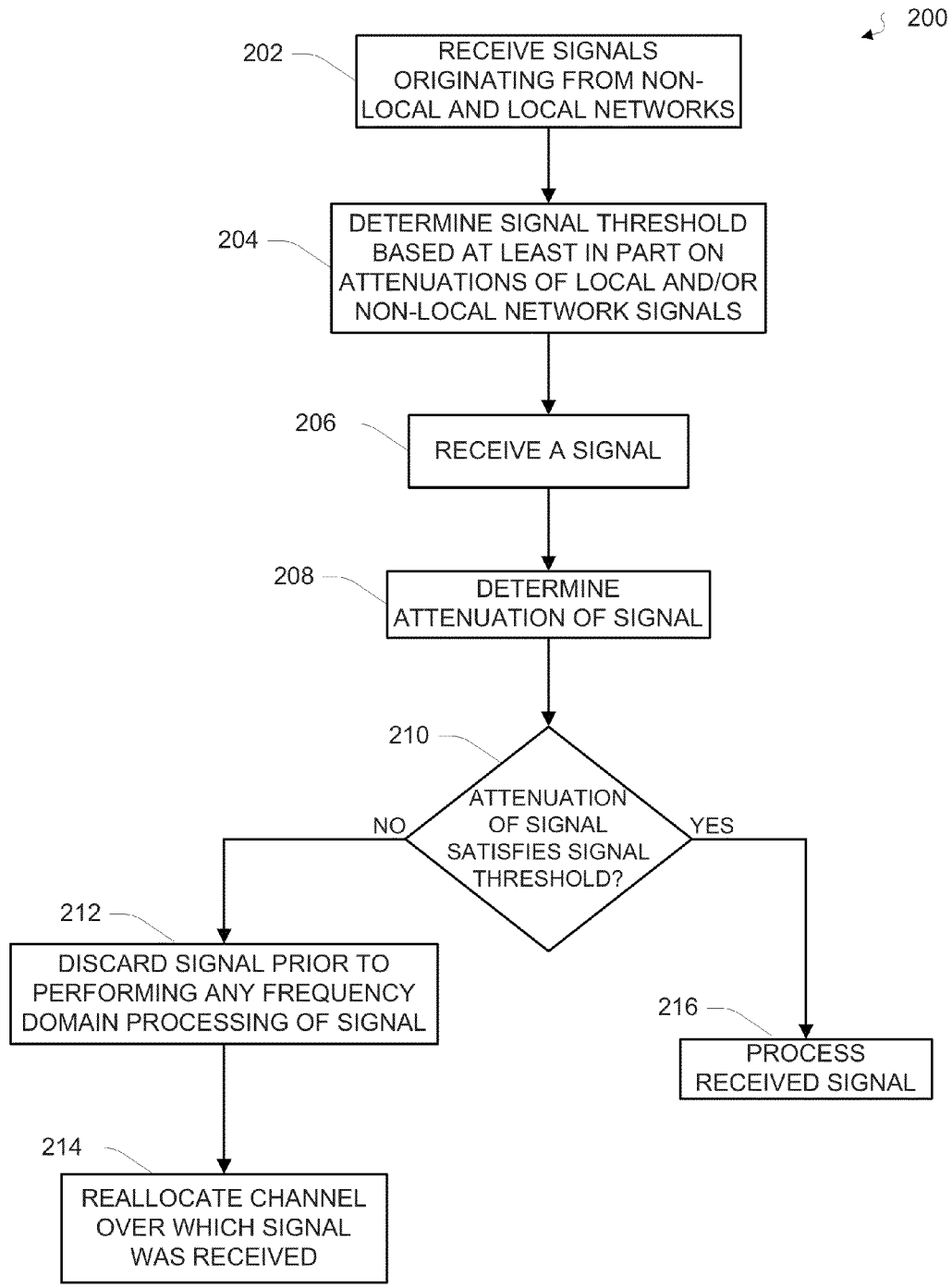
FIG. 2 illustrates a flow diagram of an example process of a network isolation system in accordance with one or more implementations.

FIG. 2 illustrates a flow diagram of an example process 200 of a network isolation system in accordance with one or more implementations. For explanatory purposes, example process 200 is described herein with reference to the example network environment 100 of FIG. 1; however, example process 200 is not limited to the example network environment 100 of FIG. 1. Further for explanatory purposes, the blocks of example process 200 are described herein as occurring in serial, or linearly. However, multiple blocks of example process 200 may occur in parallel. In addition, the blocks of example process 200 need not be performed in the order shown and/or one or more of the blocks of example process 200 need not be performed.

Any of the devices 108A-F, such as the device 108A, receives signals that originated on at least one non-local network and signals that originated on a local network (202). For example, the device 108A may receive signals over one or more channels from the devices 108B-F via the networks 106A-B; the device 108A may receive local network signals transmitted by the devices 108B-C over the network 106A that are intended for the device 108A, and the device 108A may receive non-local network signals transmitted by the devices 108D-F over the network 106B, the main line 102, and the network 106A that are not intended for the device 108A.

The device 108A determines a signal threshold, such as a signal attenuation threshold or a signal strength threshold, based at least in part on the attenuations, and/or strengths, of the local and non-local network signals (204). In one or more implementations, the signal threshold may be used to differentiate local network signals, e.g. signals that are received from the devices 108B-C via the network 106A, from non-local network signals, e.g. signals received from the devices 108D-F via the network 106B, the main line 102, and the network 106A. For example, the device 108A may determine a first range of signal values, such as measured attenuation values and/or measured signal strength values, that correspond to signals received from the devices 108B-C via the network 106A and a second range of signal values that correspond to signals received from the devices 108D-F. If there is sufficient separation between the ranges, the device 108A may set the signal threshold such that the signals received from the devices 108D-F can be differentiated from the signals received from the devices 108B-C based on the attenuation values, and/or signal strengths, of the received signals. In one or more implementations, the signal threshold may be based on one or more of: signal attenuation values, signal strength values, signal to noise ratio values, any values that may be indicative of signal quality and/or signal strength, or generally any value that may be determinable from a received signal. An example process for determining a signal threshold is discussed further below with respect to FIG. 3.

The device 108A subsequently receives a signal, such as after determining the signal threshold (206). The device 108A determines an attenuation value of the received signal (208). For example, the device 108A may include a power level detector that measures the amount of gain applied to the received signal; the device 108A may use the amount of gain applied as the attenuation value of the received signal. The device 108A determines whether the attenuation value of the received signal satisfies the signal threshold (210). For example, the signal threshold may be set such that signals having high attenuation values, e.g. above the threshold, fail to satisfy the signal threshold, and signals having low attenuation values, e.g. below the signal threshold, satisfy the signal threshold.

If the device 108A determines that the signal fails to satisfy the signal threshold (210), the device 108A discards the received signal prior to performing any processing of the signal in the frequency domain (212). Thus, the device 108A determines whether to discard received signals, and discards received signals, before any frequency domain processing is performed on the received signals. The device 108A may then reallocate the channels and/or resources over which the discarded signal was received (214). For example, the device 108A may transmit a second signal over the channel which the discarded signal was received, where the second signal is unrelated to the first signal, e.g. the second signal is sent to a different recipient than the sender of the first signal. If the device 108A determines that the signal satisfies the signal threshold (210), the device 108A may process the received signal, such as by performing frequency domain processing on the received signal.

Figure 3:
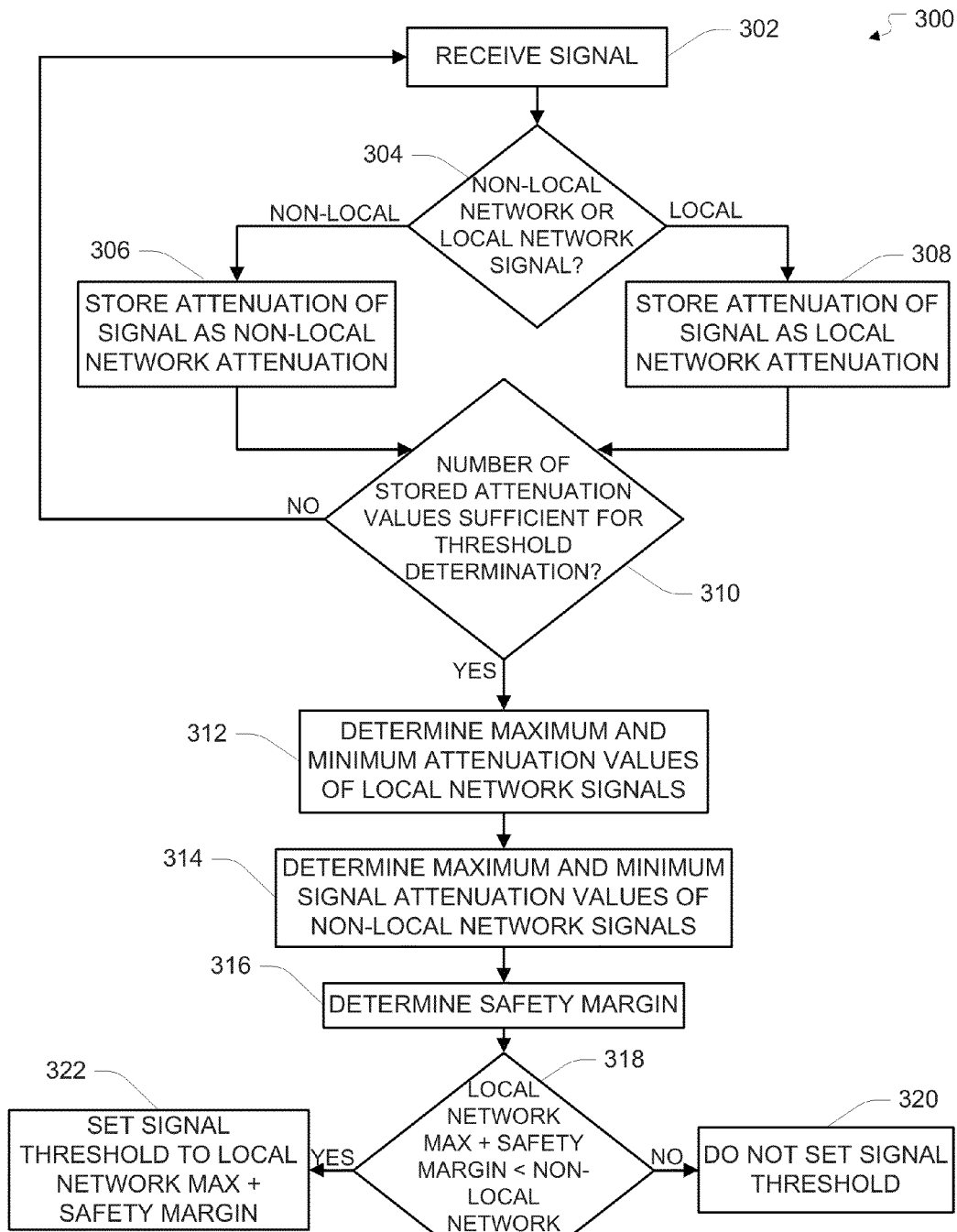
FIG. 3 illustrates a flow diagram of an example process of a network isolation system in accordance with one or more implementations.

FIG. 3 illustrates a flow diagram of an example process 300 of a network isolation system in accordance with one or more implementations. For explanatory purposes, example process 300 is described herein with reference to the example network environment 100 of FIG. 1; however, example process 300 is not limited to the example network environment 100 of FIG. 1. Further for explanatory purposes, the blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed.

Any of the devices 108A-F, such as the device 108A, receives a signal (302). The device 108A determines if the signal originated on a non-local network, such as the network 106B, or a local network, such as the network 106A (304). For example, the device 108A may attempt to decode a header, such as a frame header from the signal to determine whether the signal is addressed to, or otherwise intended for, the device 108A. Alternatively, or in addition, the device 108A may attempt to decrypt the signal using decryption keys and/or schemes associated with signals transmitted over the network 106A; if the device 108A is unable to decrypt the signal, the device 108A may determine that the signal originated on a non-local network, such as the network 106B.

If the device 108A determines that the signal originated on a non-local network (304), the device 108A determines an attenuation value, and/or a signal strength, corresponding to the signal and stores the attenuation value, and or signal strength, as a non-local network attenuation value or a non-local network signal strength, such as in a memory (306). In one or more implementations, the device 108A may include a power level detector that may measure the strength of the signal. Alternatively, or in addition, the device 108A may determine the attenuation value of the signal as the amount of gain applied to the signal, such as by an automatic gain control circuit. In one or more implementations, the device 108A may receive the amount of gain applied to the signal from the automatic gain control circuit, and/or a power level detector of the device 108A may determine the amount of gain applied by determining the differential of the signal strength measured before and after the signal is processed by the automatic gain control circuit.

If the device 108A determines that the signal originated on a local network (306), the device 108A determines an attenuation value, and/or a signal strength, corresponding to the signal and stores the attenuation value, and or signal strength, as a non-local network attenuation value or a non-local network signal strength, such as in a memory (306). The device 108A determines whether the number of stored non-local network attenuation values and/or local network attenuation values is sufficient to determine a signal threshold (310). In one or more implementations, the device 108A may collect a statistically significant number of attenuation values from non-local network signals and/or local network signals before determining the signal threshold. In one or more implementations, the number of attenuation values collected by the device 108A before determining the signal threshold may be based at least in part, e.g., on the number of devices 108A-C communicating over the network 106A.

If the device 108A determines that the number of stored attenuation values is not sufficient for determining a signal threshold (310), the device 108A receives another signal (302) and stores an attenuation value, and/or signal strength, corresponding to the signal as a non-local or local network attenuation value and/or signal strength (302-308). If the device 108A determines that the number of stored attenuation values is sufficient for determining a signal threshold (310), the device 108A determines the maximum and minimum attenuation values of the local network signals (312). The device 108A may determine the maximum and minimum attenuation values of the local network signals based on the local network attenuation values stored in the memory. The device 108A also determines the maximum and minimum attenuation values of the non-local network signals (314). The device 108A may determine the maximum and minimum attenuation values of the non-local network signals based on the non-local network attenuation values stored in the memory. The device 108A may generate one or more histograms that may be used to determine the maximum and minimum attenuation values of the local and non-local network signals. Example histograms for determining maximum and minimum attenuation values are discussed further below with respect to FIG. 4.

The device 108A may identify the maximum and minimum attenuation values of local network signals using a first range of attenuation values that correspond to the signals received from the devices 108B-C of the network 106A. The device 108A may also identify the maximum and minimum attenuation values of the non-local network signals using a second range of attenuation values that correspond to the signals received from the devices 108D-F of the network 106B, or other non-local networks The device 108A determines a safety margin that indicates a minimum separation (in attenuation value and/or signal strength) between the first range and second ranges of attenuation values and/or signal strengths in order to set a signal threshold (316). In one or more implementations, the device 108A may not be able to effectively differentiate the signals originating on the network 106B from the signals originating on the network 106A unless there is a minimum separation between the first and second ranges of attenuation values, e.g. between the maximum attenuation value of the local network signals and the minimum attenuation value of the non-local network signals. In one or more implementations, the safety margin may be determined to be between 3 dBms and 10 dBms; however, the safety margin may also be less than 3 dBms, e.g. in one or more implementations utilizing a precise and/or sensitive power level detector. The device 108A verifies that the maximum attenuation value of the local network signals, e.g. signals received from the devices 108B-C of the network 106A, plus the safety margin is less than the minimum attenuation value of the non-local network signals, e.g. signals received from the devices 108D-F of the network 106B (318).

If the device 108A determines that the maximum attenuation value corresponding to the local network signals plus the safety margin is greater than or equal to the minimum attenuation value corresponding to the non-local network signals (318), the device 108A determines that the local network signals are non-differentiable from the non-local network signals (based on the attenuation values) and therefore the device 108A does not set a signal threshold (320). If the device 108A determines that the maximum attenuation value corresponding to the local network signals plus the safety margin is less than the minimum attenuation value of the non-local network signals (308), the device 108A sets the signal threshold to the maximum attenuation value of the local network signals, e.g. the signals received from the devices 108B-C of the network 106A, plus the safety margin (322). The device 108A may then use the signal threshold to discard signals received from the devices 108D-F of the network 106B, e.g. as previously discussed with respect to FIG. 2.

Figure 4:
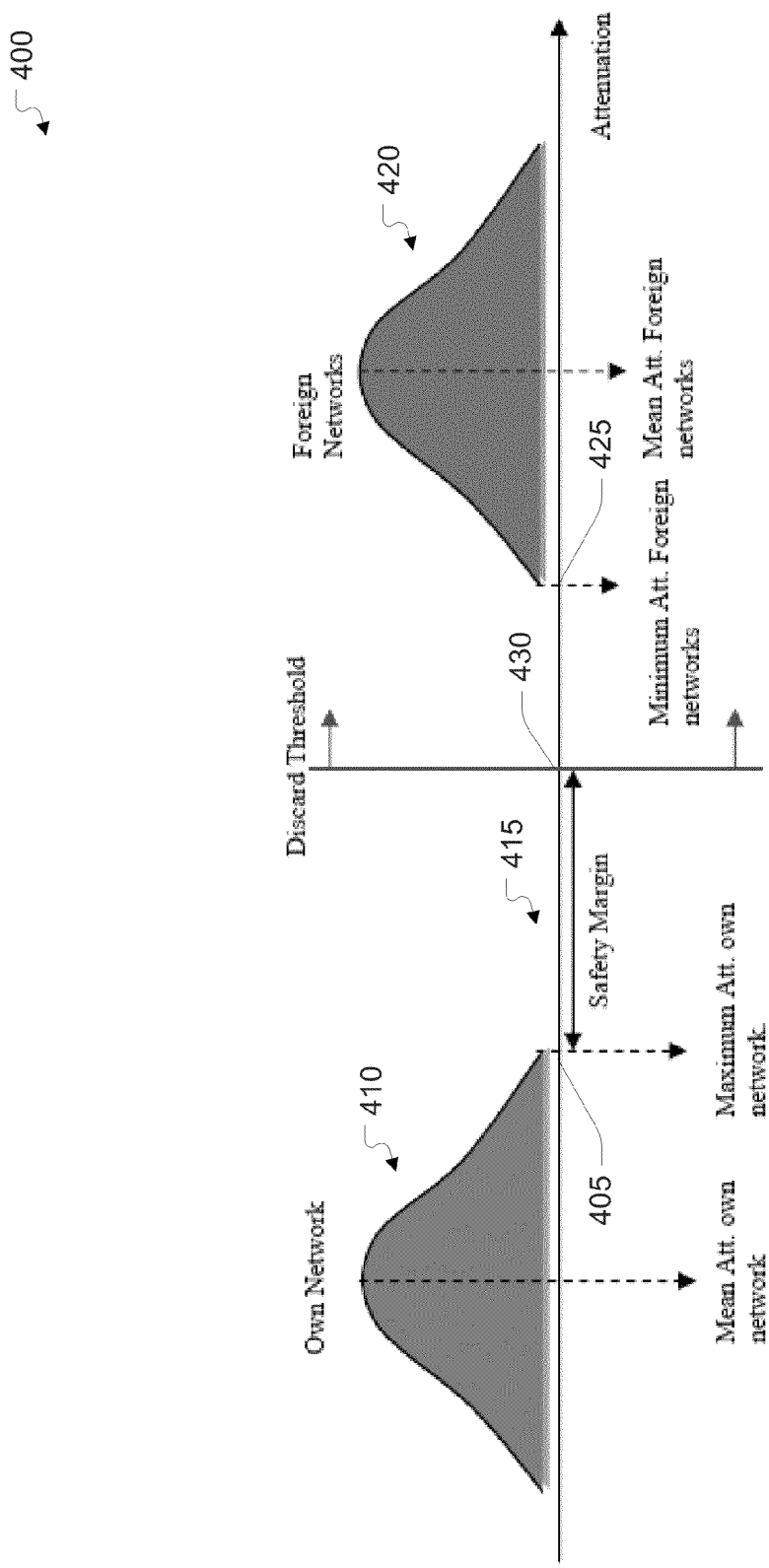
FIG. 4 illustrates an example attenuation graph of a network isolation system in accordance with one or more implementations.

FIG. 4 illustrates an example attenuation graph 400 of a network isolation system in accordance with one or more implementations. The graph 400 includes a first histogram 410 and a second histogram 420 that represent attenuation values that may have been determined by any of the devices 108A-F, such as the device 108A. The first histogram 410 may represent attenuation values that were determined by the device 108A with respect to received local network signals, e.g. signals received from the devices 108B-C via the network 106A. The first histogram 410 may include a maximum attenuation value 405 corresponding to the local network signals. The second histogram 420 may represent attenuation values that were determined by the device 108A with respect to received non-local network signals, e.g. signals received from the devices 108D-F via the network 106B. The second histogram 420 may include a minimum attenuation value 425 corresponding to the non-local network signals.

The graph 400 may also include a safety margin 415, which may be determined and/or set by the device 108A. In one or more implementations, the safety margin 415 may be determined as a value between 3 dBms and 10 dBms. The graph 400 may also include a signal threshold 430, which is equivalent to the maximum attenuation value 405 of the local network signals plus the safety margin 415. Thus, as shown in the graph 400, the separation between the maximum attenuation value 405 of the local network signals and the minimum attenuation value 425 of the non-local network signals, is greater than the safety margin 415, and therefore the signal threshold 430 may be determined as the maximum attenuation value 405 of the local network signals plus the safety margin 415.

Figure 5:
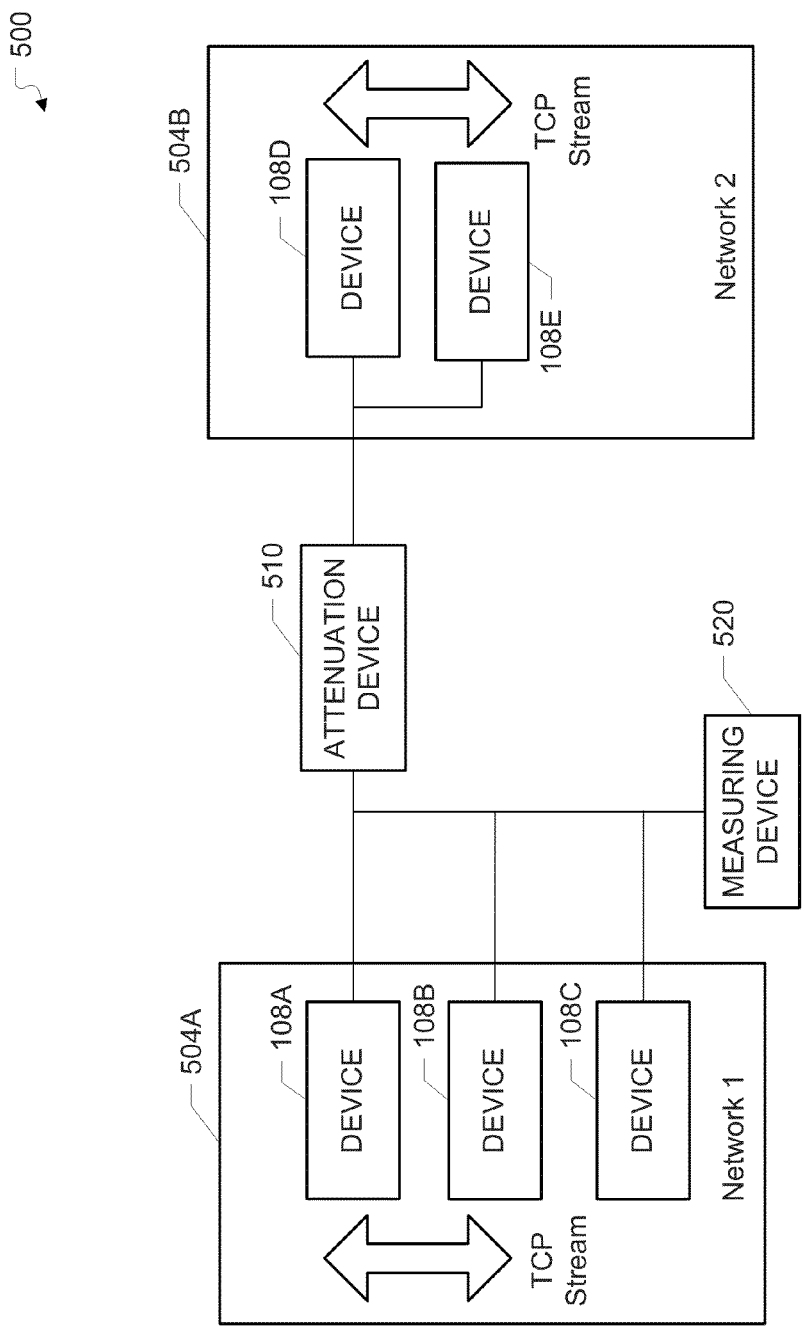
FIG. 5 illustrates an example network environment for detecting a network isolation system in accordance with one or more implementations.

FIG. 5 illustrates an example network environment 500 for detecting a network isolation system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The example network environment 500 includes a first network 504A, a second network 504B, an attenuation device 510 and a measuring device 520. The first network 504A includes devices 108A-C and the second network includes devices 108D-E. The attenuation device 510 may apply an amount of attenuation to signals transmitted between the networks 504A-B, such as 30 dBms. The measuring device 520 may be any device capable of measuring signal levels, such as an oscilloscope. The device 108C may be configured to implement a network isolation system in accordance with one or more implementations and the network environment 500 may be used to detect whether the devices 108A-B and D-E are configured to implement a network isolation system in accordance with one or more implementations. In one or more implementations, the attenuation device 510 and the measuring device 520 may be communicatively coupled to, and/or controlled by, a computing device, such as a computing device that includes a memory and a processor.

In operation, a first data stream, such as a transport control protocol (TCP) stream, may be initiated between the devices 108D-E, and the performance of the first data stream may be determined, such as based on bit rate. A second data stream is then initiated between the devices 108B-C, while the first data stream between the devices 108D-E is still active. The device 108C may verify that the data stream between the devices 108A-B is active and uses signaling compatible with one or more implementations of the subject network isolation system. For example, the device 108C may detect and decode the headers of packets and/or frames of the data stream; however, due to encryption protocols, the device 108C may be unable to decode the packets and/or frames of the data stream.

The measuring device 520 may then verify that the signals from devices 108D-E are being attenuated by the attenuation device 510 with respect to the signals from devices 108A-B, such as by 30 dBms. In one or more implementations, the measuring device 520 may also verify that the signals from devices 108A-B have maximum power, e.g. to ensure that no backoff mechanisms have been applied to the signals. The performance of the first and second data streams may be determined, such as by any of the devices 108A-E, or a computing device that is communicatively coupled to any of the devices 108A-E. If the aggregate performance of the first and second data streams is double the performance measured for the first data stream alone (e.g., before the second data stream was initiated), then one of more of the devices 108A-B or D-E may be implementing a network isolation system in accordance with one or more implementations.

Figure 6:
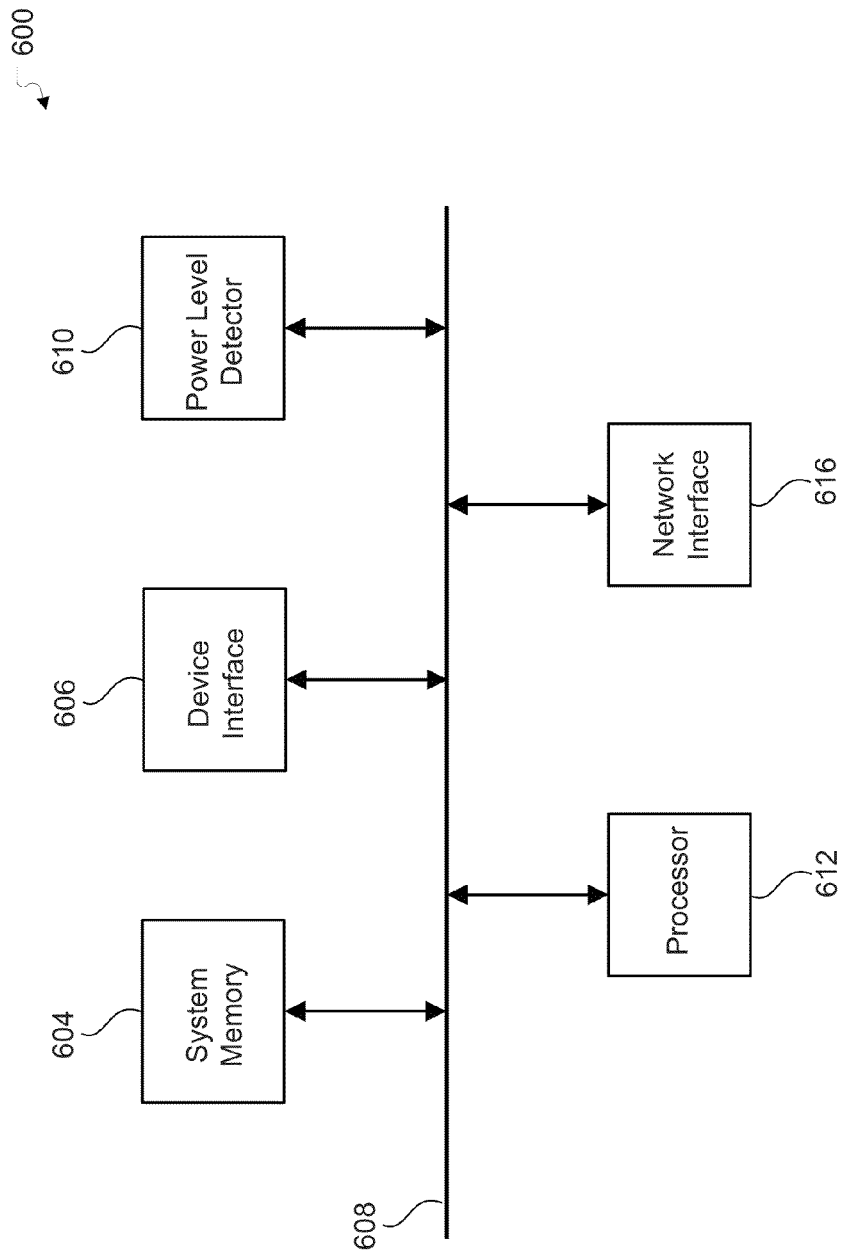
FIG. 6 conceptually illustrates an electronic system with which any implementations of the subject technology may be implemented.

FIG. 6 conceptually illustrates an electronic system 600 with which any implementations of the subject technology are implemented. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The electronic system 600, for example, can be a powerline network adapter and/or modem, digital subscriber line (DSL) adapter and/or modem, multimedia over coax alliance (MOCA) adapter and/or modem, telephone line adapter and/ or modem, wireless adapter and/or modem, and/or generally any electronic device that transmits signals over a network. Such an electronic system includes various types of computer readable media and interfaces for various other types of computer readable media. The electronic system 600 includes a bus 608, one or more processor(s) 612, a system memory 604, a device interface 606, a network interface 616, and a power level detector 610.

The bus 608 collectively represents all system, peripheral, and chipset buses that communicatively connect the numerous internal devices of the electronic system 600. In one or more implementations, the bus 608 communicatively connects the one or more processor(s) 612 with the system memory 604. The one or more processing unit(s) can be a single processor or a multi-core processor in different implementations. The system memory 604 may be a read-and-write memory device. The system memory 604 may be, and/or may include, a volatile read-and-write memory, such as random access memory, or a non-volatile read-and-write memory, such as a permanent storage device. The system memory 604 stores any of the instructions and/or data that the one or more processor(s) 612 needs at runtime. In one or more implementations, the processes of the subject disclosure are stored in the system memory 604. From these various memory units, the one or more processor(s) 612 retrieves instructions to execute and data to process in order to execute the processes of one or more implementations.

The bus 608 also couples the electronic system 600 to a network (not shown), such as the networks 106A-B, through network interface 616, and to a device, such as a computing device, through the device interface 606. The network interface 616 may couple the electronic system 600 to a powerline, a telephone line, a coaxial cable line, or generally any line that can carry, or propagate, a data signal. In one or more implementations, the device interface 606 may couple the electronic system 600 to a computing device, such as via an Ethernet connection. The computing device can then be a part of a network of computers (such as a local area network ("LAN"), a wide area network ("WAN"), or an Intranet, or a network of networks, such as the Internet, via the network interface 616 of the electronic system 600.

Lastly, the bus 608 communicatively connects the one or more processor(s) 612 to a power level detector 610, e.g. a power level detector implemented in silicon. The power level detector 610 may be used to determine the signal strength values and/or the signal attenuation values of any received signals. In one or more implementations, the power level detector 610 may determine the attenuation of a received signal based on the amount of gain applied to the received signal, such as by an automatic gain control circuit that may, in one or more implementations, be part of, and/or implemented by, the one or more processor(s) 612. Any or all components of electronic system 600 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A receiver apparatus, comprising:
    a network interface configured to receive a plurality of signals over channels, wherein the plurality of received signals comprises at least one local network signal and at least one non-local network signal;
    a power level detector configured to determine attenuation values of the plurality of received signals; and
    a processor configured to identify the at least one non-local network signal from the plurality of received signals based at least in part on the attenuation value of the at least one non-local network signal and a signal threshold, discard the at least one non-local network signal of the plurality of received signals and subsequently reallocate the channel over which the at least one non-local network signal of the plurality of signals was received, without processing the at least one non-local network signal in a frequency domain, wherein the signal threshold differentiates the at least one local network signal from the at least one non-local network signal based at least in part on the determined attenuation values.

2. The receiver apparatus of claim 1, wherein the processor is configured to generate the signal threshold based on the determined attenuation values of the plurality of received signals.

3. The receiver apparatus of claim 2, wherein the power level detector is further configured to determine the attenuation values of the plurality of signals based on gains applied to the plurality of signals.

4. The receiver apparatus of claim 3, wherein the processor is further configured to:
    determine a local network maximum attenuation value based at least in part on the at least one local network signal;
    determine a non-local network minimum attenuation value based at least in part on the at least one non-local network signal; and
    determine the signal threshold as the local network maximum attenuation value plus a safety margin when the local network maximum attenuation value plus the safety margin does not exceed the non-local network minimum attenuation value, otherwise determine that the at least one local network signal is non-differentiable from the at least one non-local network signal.

5. The receiver apparatus of claim 4, wherein the at least one local network signal originated on a local network over which the receiver apparatus communicates and the at least one non-local network signal originated on a non-local network over which the receiver apparatus does not communicate and that is distinct from the local network.

6. The receiver apparatus of claim 1, wherein the network interface is coupled to a communication medium over which the plurality of signals are received, the communication medium comprising at least one of a powerline, a coaxial cable, or a telephone cable.

7. The receiver apparatus of claim 1, wherein the processor is further configured to transmit another local network signal over the reallocated channel, the another local network signal being unrelated to the at least one non-local network signal.

8. The receiver apparatus of claim 1, wherein the power level detector is implemented in silicon.

9. The receiver apparatus of claim 1, wherein the at least one non-local network signal comprises a first non-local network signal that originated on a first non-local network and a second non-local network signal that originated on a second non-local network that is distinct from the first non-local network.

10. The receiver apparatus of claim 9, wherein the signal threshold differentiates the at least one local network signal from both the first non-local network signal and the second non-local network signal based on the determined attenuation values.

11. The receiver apparatus of claim 9, wherein the processor is further configured to:
   determine a local network maximum attenuation value based at least in part on the at least one local network signal;
   determine a non-local network minimum attenuation value based at least in part on the first non-local network signal that originated on the first non-local network and the second non-local network signal that originated on the second non-local network; and
   determine the signal threshold as the local network maximum attenuation value plus a safety margin when the local network maximum attenuation value plus the safety margin does not exceed the non-local network minimum attenuation value, otherwise determine that the at least one local network signal is non-differentiable from both the first non-local network signal and the second non-local network signal.

12. The receiver apparatus of claim 1, wherein the processor is configured to discard the at least one non-local network signal of the plurality of received signals by discarding a plurality of frames of the at least one non-local network signal.

13. The receiver apparatus of claim 1, wherein the processor is configured to generate the signal threshold based at least in part on a local network maximum attenuation value associated with the at least one local network signal and a non-local network minimum attenuation value associated with the at least one non-local network signal.

14. A method for network isolation, the method comprising:
   receiving a plurality of signals corresponding to a plurality of networks over a plurality of channels;
   determining a plurality of attenuation values of the plurality of signals;
   determining a signal threshold based on the plurality of attenuation values of the plurality of signals, wherein the signal threshold differentiates first signals of the plurality of signals that correspond to a first network of the plurality of networks from other signals of the plurality of signals that correspond to other networks of the plurality of networks based on the plurality of attenuation values;
   discarding a second signal of the plurality of signals that does not satisfy the signal threshold without processing the second signal; and
   reallocating the channel of the plurality of channels over which the second signal was received.

15. The method of claim 14, wherein determining the signal threshold based on the plurality of attenuation values of the plurality of signals further comprises:
   determining a maximum attenuation value of the plurality of attenuation values of the first signals of the plurality of signals that correspond to the first network;
   determining a minimum attenuation value of the plurality of attenuation values of the other signals of the plurality of signals that correspond to the other networks of the plurality of networks; and
   determining the signal threshold as the maximum attenuation value plus a safety margin when the signal threshold is less than the minimum attenuation value, otherwise determining that the first signals of the plurality of signals that correspond to the first network are non-differentiable from the other signals of the plurality of signals that correspond to the other networks of the plurality of networks.

16. The method of claim 14, wherein discarding the second signal of the plurality of signals that does not satisfy the signal threshold further comprises discarding a plurality of frames that correspond to the second signal of the plurality of signals that does not satisfy the signal threshold.

17. The method of claim 14, wherein determining the plurality of attenuation values of the plurality of signals further comprises:
   measuring, with a power level detector, a plurality of gains that are applied to the plurality of signals to determine the plurality of attenuation values of the plurality of signals.

18. The method of claim 14, wherein reallocating the channel of the plurality of channels over which the first signal was received further comprises transmitting a second signal over the channel of the plurality of channels over which the first signal was received, the second signal being unrelated to the first signal.

19. The method of claim 14, wherein the plurality of signals are received over a communication medium that comprises at least one of a powerline, a coaxial cable, or a telephone cable.

20. A non-transitory machine-readable medium embodying instructions that, when executed by a machine, allow the machine to perform a method for network isolation, the method comprising:
   receiving a plurality of signals corresponding to a plurality of networks over a plurality of channels;
   determining a plurality of signal metrics of the plurality of signals;
   discarding a first signal of the plurality of signals based at least in part on the signal metric of the first signal, wherein the first signal is associated with a first network of the plurality of networks; and
   transmitting a second signal over the channel of the plurality of channels over which the first signal was received, wherein the second signal is associated with a second network of the plurality of networks that differs from the first network.

21. The non-transitory machine-readable medium of claim 20, wherein the method further comprises:
    determining a signal threshold based on the plurality of signal metrics of the plurality of signals, wherein the signal threshold differentiates signals of the plurality of signals that correspond to the first network of the plurality of networks from other signals of the plurality of signals that correspond to other networks of the plurality of networks based at least in part on the determined plurality of signal metrics of the plurality of signals.

22. The non-transitory machine-readable medium of claim 21, wherein discarding the first signal of the plurality of signals based at least in part on the signal metric of the first signal further comprises:
    discarding the first signal of the plurality of signals when the signal metric of the first signal fails to satisfy the signal threshold.

23. The non-transitory machine-readable medium of claim 22, wherein the plurality of signal metrics comprise a plurality of attenuation values and determining the signal threshold based on the plurality of signal metrics of the plurality of signals further comprises:
    determining a maximum attenuation value of the plurality of attenuation values of the signals of the plurality of signals that correspond to the first network;
    determining a minimum attenuation value of the plurality of attenuation values of the other signals of the plurality of signals that correspond to the other networks of the plurality of networks; and
    determining the signal threshold as the maximum attenuation value plus a safety margin when the signal threshold is less than the minimum attenuation value, otherwise determining that the plurality of signals that correspond to the first network are non-differentiable from the other signals of the plurality of signals that correspond to the other networks of the plurality of networks.

24. The non-transitory machine-readable medium of claim 23, wherein determining the plurality of attenuation values of the plurality of signals further comprises:
    measuring, with a power level detector, a plurality of gains that are applied to the plurality of signals to determine the plurality of attenuation values of the plurality of signals.

25. The non-transitory machine-readable medium of claim 20, wherein the plurality of signals are received over a communication medium that comprises at least one of a power-line, a coaxial cable, or a telephone cable.

* * * * *